United States Patent

Cotutsca

Patent Number: 6,059,123
Date of Patent: May 9, 2000

[54] MULTIPLE MEDIA STORAGE RACK

[76] Inventor: Peter Cotutsca, P.O. Box 302, Tesuque, N.Mex. 87574-0302

[21] Appl. No.: 09/293,515

[22] Filed: Apr. 15, 1999

[51] Int. Cl.[7] ............................ A47G 29/00; A47G 19/08
[52] U.S. Cl. ............................................ 211/40; 211/41.12
[58] Field of Search .................................. 211/40, 41.12, 211/134, 41.18; 108/92, 59; 312/9.9, 9.47, 9.48, 9.51, 9.52, 9.26; 206/308.2

[56] References Cited

FOREIGN PATENT DOCUMENTS

WO 86/06599   11/1986   WIPO .................................. 211/41.12

*Primary Examiner*—Daniel P. Stodola
*Assistant Examiner*—Erica B. Harris

[57] ABSTRACT

A storage rack for flat rectangular and/or round articles such as audio and video cassettes, compact disks, computer disks, computer tape cartridges and many types of digital or analog, and/or magnetic or optical storage media comprises a shelf unit having a rear vertical support and a plurality of spaced parallel shelves projecting outwardly from the rear vertical support, and a support mechanism for supporting the storage rack in an upright position with the rear vertical support inclined vertically. Each adjacent pair of shelves comprises stepped formations to slideably receive the rearmost portion of a plurality of articles of various shape and size, and to support the article in a generally upwardly inclined orientation. Articles of various shapes and sizes can be stored interchangeably at any available horizontal and vertical storage position within the multiple media storage rack.

5 Claims, 3 Drawing Sheets

MULTIPLE MEDIA STORAGE RACK

MULTIPLE MEDIA STORAGE RACK

BACKGROUND OF THE INVENTION

1. Field of the Invention

The present invention relates to a storage rack for storing a wide variety of optical and magnetic recorded media of various physical shapes and sizes, such as compact discs, video and audio cassettes, computer disks and tapes, analog and digital recording media and the like in a visible, easily accessible and organized fashion.

Compact and easily accessible storage racks for cases containing various types of recorded media, such as described above, are desirable to facilitate organization of a plurality of such material and also to reduce the risk of damage or loss.

2. Brief Description of Prior Art

It has been the conventional practice to provide storage means for recorded media, limited to only one, or at the most two or three different shapes and sizes and also limited to the relative placement of such articles. Although such prior storage racks have been useful for their intended purpose, the implementation and ease of operation remains inflexible, rigid and limited.

Therefore, a long-standing need has existed to provide a more versatile and flexible means to conveniently store a wide variety of different types, shapes and sizes of recorded media. Such a means supports the multiple media storage rack described herein.

The present invention therefore eliminates these restrictions and uniquely accommodates a multiplicity of articles of recorded media to be stored interchangeably at any available vertical and/or horizontal position within the storage rack.

SUMMARY OF THE INVENTION

It is the intent of the present invention to provide a uniquely superior and flexible storage means for articles such as compact discs, video & audio cassettes, analog and/or digital recording media, computer disks and tapes, magnetic and optical storage media and the like.

Accordingly, the present invention comprises a rack unit comprising a rear vertical support and a plurality of equally spaced, parallel shelves projecting outwardly from the rear vertical support, comprising a plurality of stepped formations between each adjacent pair of shelves. The stepped formations are arranged in parallel to the shelf and may span the full or a partial width of the shelf, and function as retaining slots for articles of various thickness to facilitate secure storage of the article on the shelf.

Each adjacent pair of shelves is shaped and dimensioned, for slideably receiving the rear most portion of an article to be stored so that the frontmost portion of the article, depending on the depth dimension of the article, may project outwardly from the rack. In addition, the underside of each shelf includes said stepped formations for seating articles of various size and thickness in a slightly upward tilted angled orientation with its frontmost portion located in a staggered relationship relative to the next adjacent stored article.

The article is inserted with a downward and forward sliding motion towards the rear vertical support. When the article's rearmost portion contacts a stepped formation corresponding to the article's thickness and retaining slot height, the article is stored securely on the shelf.

The depth dimension of each shelf, protruding from the rear vertical support of the unit, may be relatively short as compared to the corresponding depth dimension of the article to be stored so that a portion of the article may project outwardly from the rack depending on the article's depth dimension.

Preferably, the storage rack may be manufactured by extrusion as a continuous strip, from a suitable plastic, metal or other composite material, and the extruded strip may then be cut to the desired length according to the desired range of storage capacities. It may be cut to accommodate one or multiple vertical columns of stored articles, according to the selected length dimension of the storage rack.

Preferably, the storage rack may include a support assembly which positions the storage rack in an upright orientation with the rear vertical support inclined vertically. The storage rack can be wall mounted as well as set on a horizontal surface. The support assembly may be removable to allow the user to select the appropriate storage configuration according to their preference.

The multiple media storage rack, as described above, is compact, easy to use and uniquely flexible for conveniently storing articles of a flat, rectangular and/or round shape which must be stored in quantity.

DESCRIPTION OF DRAWINGS

The present invention, both as to its organization and manner of operation, together with further objects and advantages thereof, may best be understood with reference to the above description, taken in connection with the accompanying drawings in which:

FIG. 5 is a side view of the storage rack as it pertains to the practical storage and placement of various articles and the like.

DESCRIPTION OF THE PREFERRED EMBODIMENT

Figure 1:
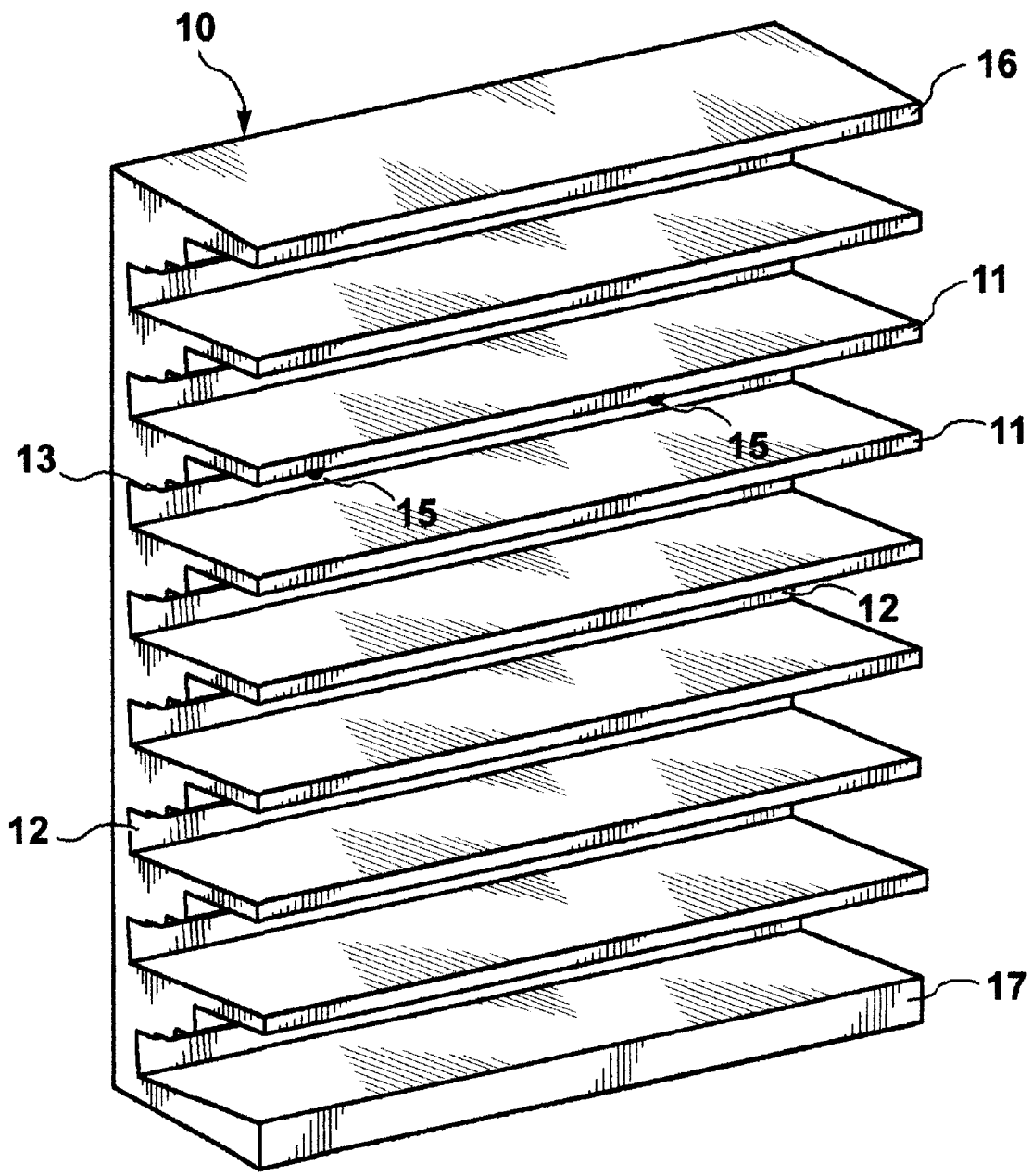
FIG. 1 is a perspective, three-dimensional view of the basic form of the storage rack according to the first embodiment of the invention.

Referring to FIG. 1, a perspective view of the present invention is shown, wherein the multiple media storage rack comprises a shelf unit 10 having a rear vertical support 12 and a plurality of parallel, spaced shelves 11 projecting outwardly from the rear vertical support 12. The stepped formations 13, positioned below each shelf 11, function as a retaining slot for stored articles. Each stepped formation 13 is located and spaced to accommodate the storage of at least one or multiple types of articles. The top shelf 16 and bottom shelf 17 are designed to accommodate multiple shelf units 10 to be mounted by use of mounting holes 15 adjacently to each other and also represent the top and bottom perimeters of the shelf unit 10. In addition, the parallel shelves 11 may vary in quantity to accommodate a higher or lower storage capacity of articles.

Figure 2:
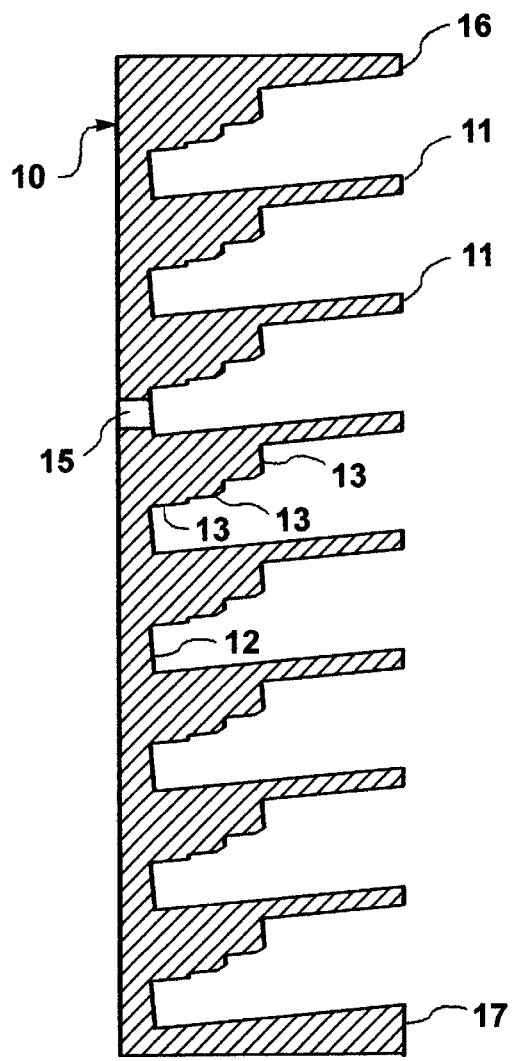
FIG. 2 is a side view of the preferred embodiment of the invention.

Referring to FIG. 2, a side view of the invention is shown, wherein the shelves 11 are designed to slideably receive the rearmost portion of an article to be stored. The stepped formations 13, protruding from the rear vertical support 12, are designed to provide a plurality of retaining slots which can accommodate a multiplicity of articles of various thickness, length and width. A plurality of mounting holes 15 is provided to mount the storage rack 10 on a vertical support surface, such as a wall.

Figure 3:
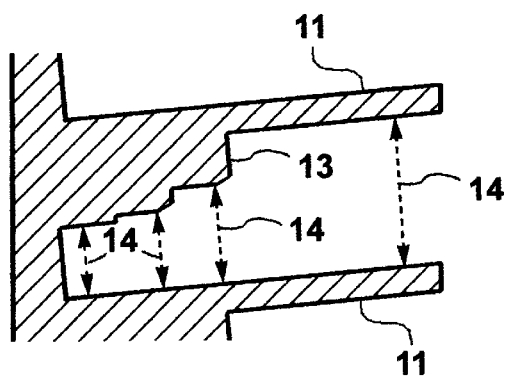
FIG. 3 is an enlarged side view showing in detail the shape and dimensions of the stepped formations comprising the resulting retaining slot heights.

Referring to FIG. 3, an enlarged and detailed side view of a shelf portion, displays the preferred placement, shape and dimensions of the stepped formations 13 and the resulting plurality of retaining slot heights 14 they provide. The variety of stepped formations 13 and the resulting retaining slots 14 may vary in quantity and/or dimension to accommodate a higher or lower storage capacity of articles.

Figure 4:
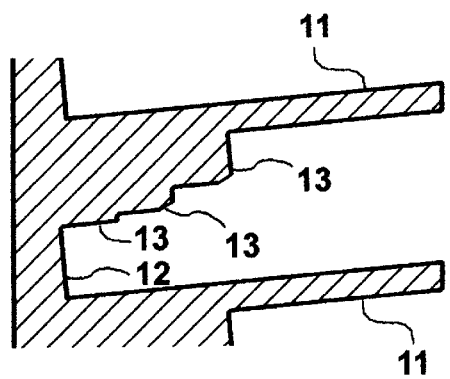
FIG. 4 is an enlarged side view showing in detail the shape and dimensions of a shelf portion comprising stepped formations.

Referring to FIG. 4, an enlarged and detailed side view of a shelf portion 11, the stepped formations 13 may be designed and arranged to be more or less in quantity, and/or of different width and height dimensions. The angle of tilt of the shelves 11, relative to the horizontal, is preferably of the order of five to ten degrees, to facilitate secure storage of the articles, aided by the force of gravity.

Figure 5:
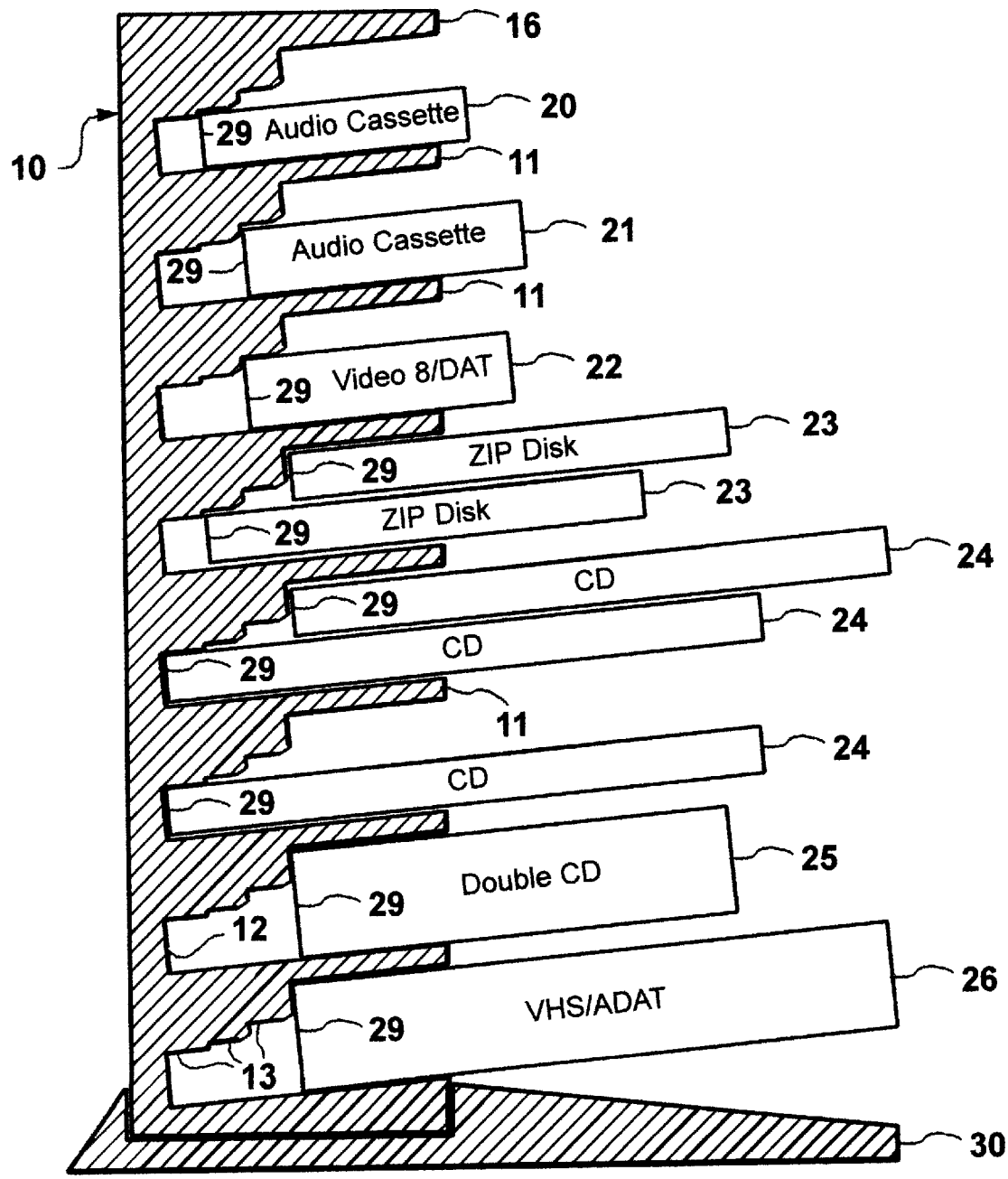

Referring to FIG. 5, a side view of the invention, demonstrates the practical application of the rack 10, as it is used to store articles 20–26 of varying thickness, width and length. The shelves 11 and stepped formations 13 are designed to slideably receive the rearmost portion 29 of an article 20–26 to be stored in a slightly inclined position. The thickness of the articles 20–26 correlates directly to the dimensions of the stepped formation 13 that retains the article 20–26 by its rearmost portion 29 at the appropriate depth position on the shelf 11.

Article 20 represents the dimensions of a Compact Cassette without a storage case.

Article 21 represents the dimensions of a Compact Cassette with a storage case.

Article 22 represents the dimensions calf a Video-8 type storage case or a DAT (Digital Audio Tape) type storage case.

Articles 23 represent the dimensions of a ZIP Disc storage case. Preferably, the dimension between the parallel shelves 11 in combination with the stepped formations 13 allows article 23 to be stacked on top of another article 23 to double the storage capacity of the rack 10.

Articles 24 represent the dimensions of a Compact Disc storage case. As shown, the dimension between the parallel shelves 11 in combination with the stepped formations 13 allows article 24 to be stacked on top of another article 24 to double the storage capacity of the rack 10.

Article 25 represents the dimensions of a Double Compact Disc storage case.

Article 26 represents the dimensions of a VHS videocassette with or without storage case and also the dimensions of an ADAT (Alesis Digital Audio Tape) storage case.

The above descriptions of articles 20–26 are primarily for exemplary purposes. The storage variety of different types of articles, accommodated by the rack 10, will vary depending on the quantity, shape and dimensions of the stepped formations 13 and the resulting plurality of retaining slots 14. By design the rack 10 may accommodate many more types of articles to be stored such as computer data storage tapes, floppy disks, removable hard disk cartridges, mini discs and the like.

Additionally, the storage rack 10 may include a support assembly 30 which positions the storage rack 10 in an upright orientation with the rear vertical support 12 inclined vertically. The storage rack 10 may be wall mounted by use of the mounting holes 15, as well as placed on a horizontal surface. The support assembly 30 may be removable to allow the user to select the appropriate storage configuration according to their preference.

Other ornamental features can be imparted to the rack 10 such as using different designs in width, height, depth and shape of the storage rack 10.

While particular embodiments of the present invention have been shown and described, it will be obvious to those skilled in the art that changes and modifications may be made without departing from this invention in its broader aspects. There may also be several different components and materials used. The appended claims cover all such changes and modifications as fall within the true spirit and scope of this invention.

What is claimed is:

1. A storage rack for flat multiple media articles comprising:

a) a shelf unit having a rear vertical support and a plurality of spaced, parallel shelves projecting outwardly from the rear vertical support;

b) each shelf of said shelves having a top surface and a bottom surface, wherein stepped formations project from said bottom surface toward the top surface of the next lower shelf;

c) each adjacent pair of shelves defines a plurality of retaining slots for frictionally receiving the rearmost portion of an article to be stored between said stepped formations and the top surface of the next lower shelf, wherein said shelves are upwardly inclined so that said articles are retained in an upwardly inclined orientation when said shelf unit is positioned upright; and d) mounting means on said rear vertical support in the form of a plurality of mounting holes for selectively hanging said rack on a wall or a support surface with said rear vertical support extending vertically.

2. The storage rack of claim 1 further comprising support means removably mounted on the bottom of the rack for selectively supporting said shelf unit in an upright orientation with said rear vertical support extending vertically on a horizontal surface.

3. The storage rack as claimed in claim 1, wherein each shelf provides simultaneous storage of different types of articles, along the entire width dimension of a shelf.

4. A storage rack for flat multiple media articles comprising:

a) a shelf unit having a rear vertical support and a plurality of spaced, parallel shelves projecting outwardly from the rear vertical support to a predetermined depth, wherein said shelves have a top surface and a bottom surface and are retained in an upwardly inclined orientation;

b) said shelves comprising stepped formations projecting from said bottom surface for retaining the rearmost portion of the articles to be stored thereon, wherein said stepped formations between each pair of shelves cooperate with the top surface of the lower shelf of said pair of shelves to support said articles in an upwardly inclined orientation; and c) mounting means on said rear vertical support in the form of a plurality of mounting holes for selectively hanging said rack on a wall or a support surface with said rear vertical support extending vertically.

5. The storage rack as claimed in claim 4, wherein support means are removably mounted on said rack for facilitating the support of the rack with its rear vertical support oriented vertically.

\* \* \* \* \*